(12) United States Patent
Marman et al.

(10) Patent No.: US 8,793,801 B2
(45) Date of Patent: Jul. 29, 2014

(54) SYSTEMS AND METHODS TO SECURE RESTRICTED INFORMATION IN ELECTRONIC MAIL MESSAGES

(75) Inventors: Timothy Marman, New York, NY (US); Rajiv Kukreja, Jersey City, NJ (US)

(73) Assignee: Goldman, Sachs & Co., New York, NY (US)

( * ) Notice: Subject to any disclaimer, the term of this patent is extended or adjusted under 35 U.S.C. 154(b) by 1126 days.

(21) Appl. No.: 11/750,562

(22) Filed: May 18, 2007

(65) Prior Publication Data

US 2008/0289037 A1 Nov. 20, 2008

(51) Int. Cl.
*G06F 7/04* (2006.01)

(52) U.S. Cl.
USPC .......................................................... 726/26

(58) Field of Classification Search
USPC ......... 726/1, 11, 12, 26, 27, 30; 713/153, 154
See application file for complete search history.

(56) References Cited

U.S. PATENT DOCUMENTS

| | | | |
|---|---|---|---|
| 5,958,007 A | 9/1999 | Lee et al. | |
| 6,584,564 B2 | 6/2003 | Olkin et al. | |
| 6,732,101 B1 | 5/2004 | Cook | |
| 7,093,029 B2 | 8/2006 | Brown et al. | |
| 2002/0178353 A1* | 11/2002 | Graham | 713/151 |
| 2004/0078334 A1* | 4/2004 | Malcolm et al. | 705/50 |
| 2004/0103147 A1* | 5/2004 | Flesher et al. | 709/204 |
| 2005/0268327 A1* | 12/2005 | Starikov | 726/1 |
| 2006/0174111 A1* | 8/2006 | Burns | 713/166 |
| 2009/0300770 A1* | 12/2009 | Rowney et al. | 726/26 |

OTHER PUBLICATIONS

P. Hoffman, Enhanced Security Services for S/MIME (RFC 2634), Jun. 1999.*
W. Nicolls, Implementing Company Classification Policy with the S/MIME Security Label, Request for Comments: 3114, May 2002.*

* cited by examiner

*Primary Examiner* — Brandon Hoffman
(74) *Attorney, Agent, or Firm* — Perkins Coie LLP

(57) ABSTRACT

Systems and methods are provided to secure restricted information in electronic mail messages. According to some embodiments, it is determined at a client device that an email message is being generated by a user. A security classification may be associated with the email message, and the email message may be sent toward a destination along with an indication of the security classification, wherein the email message is routed based, at least in part, on the security classification.

20 Claims, 9 Drawing Sheets

900

| RECIPIENT ID 902 | RECIPIENT NAME 904 | RECIPIENT EMAIL ADDRESS 906 | SECURITY INFORMATION 908 |
|---|---|---|---|
| R1001 | JANE WEST | JANE@COMPANY.COM | INTERNAL - ADVISORY |
| R1002 | JOHN SMITH | JSMITH@EXTERNAL.COM | PROJECT - AMBER |

FIG. 9

SYSTEMS AND METHODS TO SECURE RESTRICTED INFORMATION IN ELECTRONIC MAIL MESSAGES

COPYRIGHT AUTHORIZATION

A portion of the disclosure of the patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The present invention relates to restricted information. In particular, the present invention relates to systems and methods to secure restricted information in electronic mail messages.

BACKGROUND

In some cases, an enterprise may need to restrict access to information within the enterprise and/or prevent certain types of information from "leaking" outside the enterprise. For example, regulations or business procedures might require that a user (or a group of users) be prevented from accessing restricted financial information associated with a particular business deal or company. The restricted financial information might represent, for example, material non-public information, client confidential information, and/or trade secrets or other information associated with the enterprise (or client or customer of the enterprise).

To secure information, such as electronic documents, spreadsheets, or other types of files, procedures and rules could be established for users. For examples, employees might be told that information stored in a particular type of folder should never be attached to email messages that are sent outside of the enterprise. Such an approach, however, could be ineffective because of users who mistakenly forget to follow the rules and/or intentionally violate procedures. Moreover, managing and enforcing appropriate restrictions can be difficult—especially when there are a large number of users and/or types of restricted information.

As another approach, an email application could be designed in a way that prevents users from attaching any electronic file to a message. Similarly, an email application could be designed in a way that only allows users to send messages to a pre-defined set of recipients (e.g., only to other employees). In either case, however, the restrictions may impractically limit a user's ability to communicate with others (e.g., with respect to non-confidential information).

SUMMARY

To alleviate problems inherent in the prior art, the present invention introduces systems and methods to secure restricted information in electronic mail messages.

In some embodiments of the present invention, it is determined at a client device that an email message is being generated by a user. A security classification may be associated with the email message, and the email message may be sent toward a destination along with an indication of the security classification. In addition, the email message may be routed based, at least in part, on the security classification.

According to other embodiments, a client device is provided to determine that an email message is being generated by a user. Moreover, an input device may be provided to receive information associated with a security classification for the email message. In addition, a transmitting device may send the email message toward a destination along with an indication of the security classification such that the email message is routed based, at least in part, on the security classification.

According to still other embodiments, information associated with a white list is received from a remote server and stored locally at a client device. It may then be determined at the client device that an email message is being generated by a user.

According to these embodiments, a security classification may be associated with the email message via a plug-in application executing at the client device. A recipient of the email message may then be compared with the locally stored white list based at least in part on the security classification. If the recipient is not on the white list, it may be confirmed with the user that the recipient should receive the email message. It may then be determined whether a destination associated with the email message is (i) within a local environment or (ii) external to the local environment. If the destination is external, information may be provided via a Web site in accordance with the security classification.

Some other embodiments comprises: means for determining at a client device that an email message is being generated by a user; means for associating a security classification with the email message; and means for sending the email message toward a destination along with an indication of the security classification, wherein the email message is routed based, at least in part, on the security classification.

With these and other advantages and features of the invention that will become hereinafter apparent, the invention may be more clearly understood by reference to the following detailed description of the invention, the appended claims, and the drawings attached herein.

BRIEF DESCRIPTION OF THE DRAWINGS

FIG. 9 is a tabular representation of a white list database according to one embodiment of the present invention.

DETAILED DESCRIPTION

Some embodiments described herein are associated with "restricted information." As used herein, the phrase "restricted information" may refer to any information that should be accessed by certain users but not by other users. The restricted information might include, for example, electronic files, text information, spreadsheets, graphical information, and/or audio information. Examples of restricted information include (but are not limited to) financial information, material non-public information, confidential, client confidential or proprietary or classified information, information subject to legal, executive, or professional privilege or immunity, information for which a particular security clearance may be required, and information restricted by a regulatory body or self-regulatory organization or by government, judicial, administrative, regulatory, self regulatory organization rule, order or authority.

Figure 1:
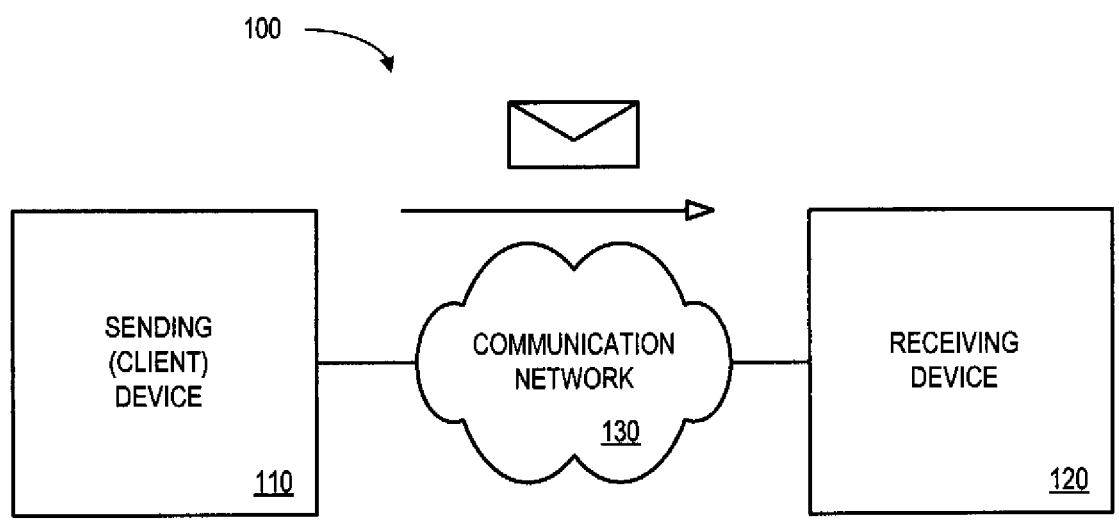
FIG. 1 is a block diagram overview of a system according to some embodiments of the present invention.

FIG. 1 is a block diagram overview of a system 100 according to some embodiments of the present invention. In particular, a sending or "client" device 110 may be used to generate an email message to be sent to a receiving device 120 via a communication network 130. As used herein, the phrase "communication network" may refer to, by way of example only, a Local Area Network (LAN), a Metropolitan Area Network (MAN), a Wide Area Network (WAN), a proprietary network, a wireless network, an Ethernet network, and/or an Internet Protocol (IP) network such as the Internet, an intranet, and/or an extranet. The sending device 110 and/or receiving device 120 might comprise, for example, personal computers, personal digital assistants, mobile computers, and/or wireless devices. Although a single sending device 110, receiving device 120, and communication network 130 are illustrated in FIG. 1, a plurality of any of these elements might be provided.

According to some embodiments of the present invention, the sending device 110 may determine that an email message is being generated by a user (e.g., that the user has selected "File, New, Mail Message" via the MICROSOFT OFFICE OUTLOOK® email application). Moreover, an input device associated with the sending device 110 may be used to provide information associated with a security classification for that email message. By way of example only, a computer mouse or keyboard may be used in connection with a display 200 such as the only illustrated in FIG. 2 to select a security classification for the email message (e.g., by selecting "Internal-Banking" or "External"). According to some embodiments, the security classification may be selected via a toolbar with drop-down boxes that have been added to an email application display. The email message may be routed through the communication network 130 based, at least in part, on the security classification.

According to some embodiments, the sending device 110 might review a recipient list of an email message based on the security classification. That is, if only employees working in "Banking" should receive the message, the recipient list might be reviewed to determine if any recipients do not, in fact, work for Banking. According to some embodiments, when a user "sends" the email message, a plug-in may validate the recipient list against the specified classification according to an internal rule set. If any recipients do not fall into the selected distribution, the user may be prompted to make a change before the message is allowed to be sent. For example, if a user selects Internal-Banking as the distribution but adds a Firm wide recipient, he or she may be prompted to change the classification or to remove the recipient. If the user decides to ignore the prompt and sends the message anyway, it may be blocked in the communication network 130.

Figure 3:
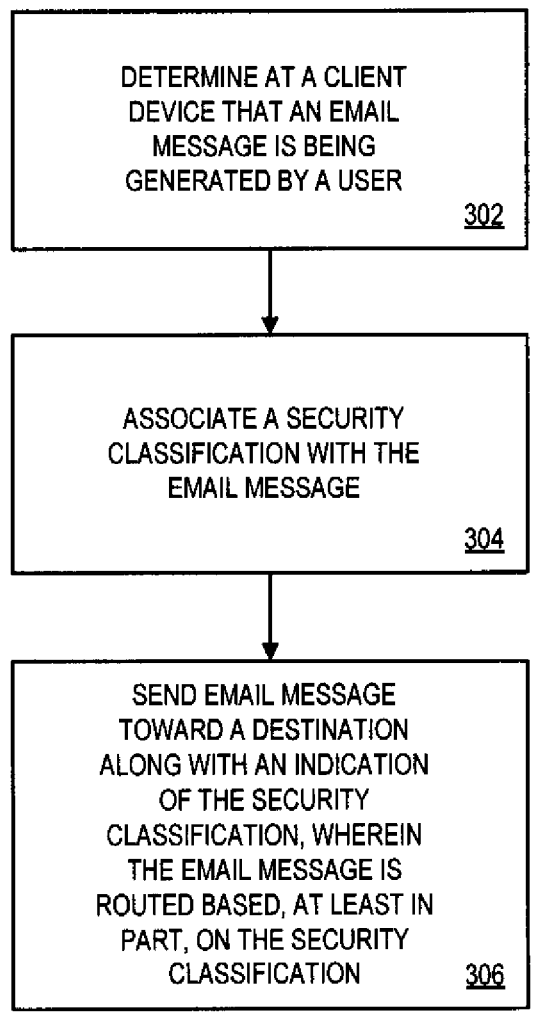
FIG. 3 is a flow chart of a method of facilitating a secure distribution of information according to some embodiments of the present invention.

FIG. 3 is a flow chart of a method of facilitating a secure distribution of information according to some embodiments of the present invention. The flow charts described herein do not imply a fixed order to the steps, and embodiments of the present invention may be practiced in any order that is practicable.

At 302, it may be determined at a client device that an email message is being generated by a user, and a security classification may be associated with the email message at 304. For example, the determination and/or association may be performed by an email application (e.g., MICROSOFT OFFICE OUTLOOK®), a plug-in application, an email application object, and/or an email application script executing at a client device. According to some embodiments, a plug-in application may compare a recipient of the email message with a list of potential recipients based at least in part on the security classification. The list might comprise, for example, a white list stored locally at the client device that is periodically updated by a remote device.

Figure 2:
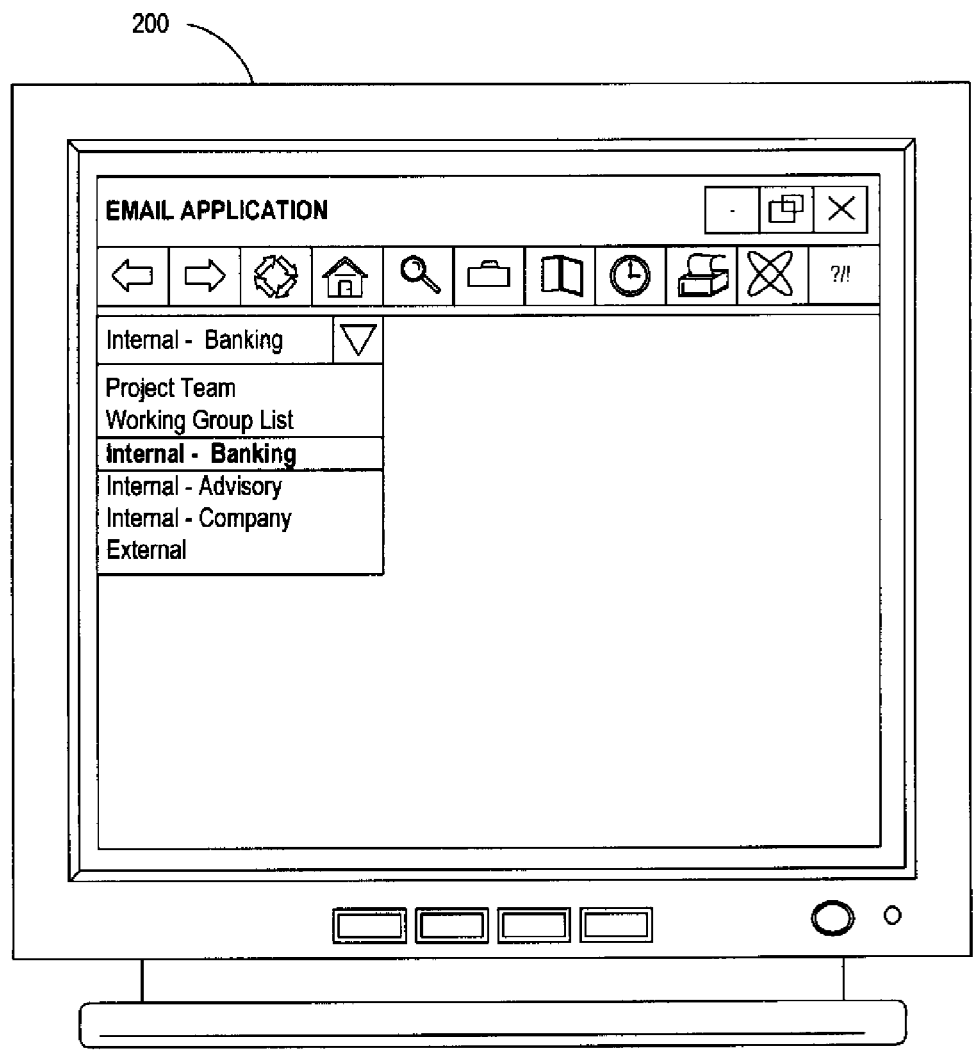
FIG. 2 illustrates a display according to some embodiments of the present invention.

According to some embodiments, the security classification may be received from a user via a Graphical User Interface (GUI) display such as the one illustrated in FIG. 2. In some cases, a default security classification might be automatically selected and provided to the user. For example, all email messages might automatically default to the most restrictive level of classification. A user might then adjust the default security classification (e.g., by selecting a less restrictive one). According to some embodiments, information associated with such an adjustment may be logged (e.g., stored locally at the client device and/or at a remote server). Such a log might be helpful, for example, to review overall user behavior (e.g., and then changing the system's default setting as a result of the review) or the investigate particular incidents (e.g., to determine who authorized an inappropriate leak of information).

According to some embodiments, a client device (or some other device) might automatically select and associated the security classification. For example, the security classification might be selected based at least in part on: information included in the email message, an attachment associated with the email message (as used herein, a file that is "inserted" into the body of an email message is considered "attached" to that email message), information associated with a user, and/or information associated with a destination of the email message.

At 306, the email message may be sent toward a destination along with an indication of the security classification, wherein the email message is to be routed based, at least in part, on the security classification. For example, one or more rules associated with the security classification may be enforced at the client device and/or a server remote from the client device. The remote server might, for example, be associated with a Secure Mail Service (SMS), a Message Managing System (MMS), and/or an Integrated Messaging Exchange (IME). Results of rule enforcement might include, for example, automatically modifying the email message in accordance with the security classification (e.g., removing an attachment) and/or preventing the email message from reaching a destination in accordance with the security classification.

Figure 4:
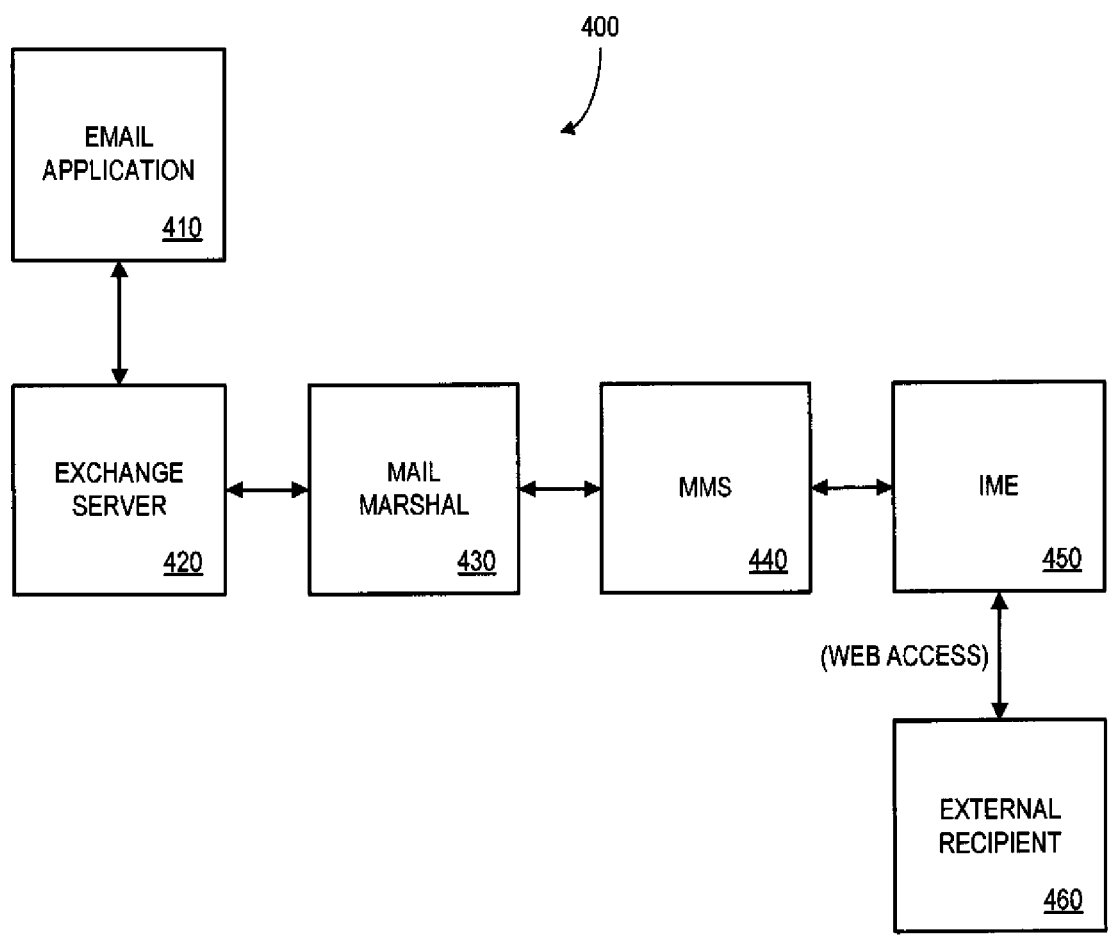
FIG. 4 is a block diagram overview of a system according to some embodiments of the present invention.

FIG. 4 is a block diagram overview of a system 400 according to some embodiments of the present invention. Note that the system 400 may include one or more firewalls. As used herein the term "firewall" may refer to any hardware and/or software that protects the resources of a network. For example, the firewall might examine network packets to determine whether the packets will be forwarded to destinations within the secure network. The firewall might also include one or more proxy servers that make network requests on behalf of client device users within the network.

According to some embodiments, an email application 410 may transmit an email message along with an indication of a security classification via a MICROSOFT EXCHANGE® server 420. Although an EXCHANGE® sever 420 is provided herein as an example, note that any other types of appropriate devices may used instead (e.g., a BLACK-BERRY® server). For example, when a user "sends" the email message, a classification label may be saved as a Message Application Program Interface (MAPI) property on the message. The EXCHANGE® server 420 might then convert the MAPI property to a Simple Mail Transfer Protocol (SMTP) header.

The EXCHANGE® server 420 may then send the message to a MMS 440 via an email content security device, such as the MAIL MARSHAL® 430 application provided by FLEXIMATION SYSTEMS INC.® The MMS 440 may then arrange for information to be received by an external recipient 460 via an IME 450. The MMS 440 and/or IME 450 may be, for example, TUMBLEWEED® applications. Although single elements are illustrated in FIG. 4, note that embodiments may include any number of such elements. Moreover, a single device might act as multiple components (e.g., a single computer might act as both the MMS 440 and the IME 450). Note that the MMS 440 and IME 450 might communicate, for example, via a Common Object Request Broker Architecture (COBRA) interface.

Any of the devices in the system 400 may be used to enforce one or more rules and/or to route an email message in accordance with the message's security classification. For example, if an email message's security classification indicates that a particular attachment is "restricted," the system 400 may arrange for the external recipient 460 to receive the information from the IME 450 via a secure Web interface. According to some embodiments, the Web interface may be encrypted over the Secure Sockets Layer (SSL) protocol.

Figure 5:
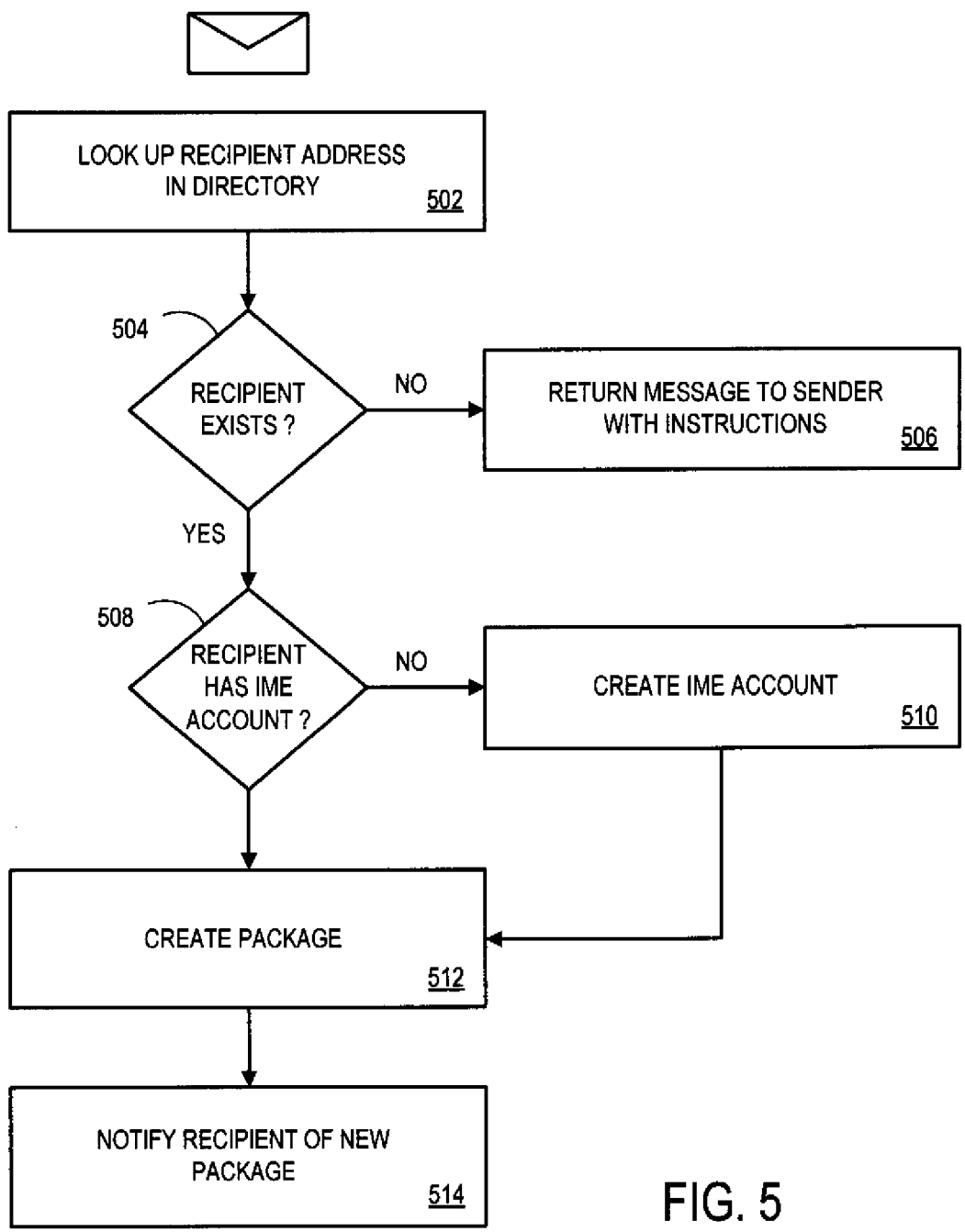
FIG. 5 is a flow chart of a method according to some embodiments of the present invention.

FIG. 5 is a flow chart of a method that may be used to provide "restricted" information to the external recipient 460 according to some embodiments of the present invention. In particular, the external recipient 460 will access the information as a package from the IME 450 via a secure Web interface. At 502, the recipient's address is looked up in a directory. For example, the address might be looked up in an active directory to determine whether or not the recipient is currently enrolled with an account on the IME 450.

If the recipient does not exist in the directory at 504, the message is returned to the sender at 506. The returned message might, for example, be accompanied by instructions that the sender should follow in order to have the recipient added to the directory (e.g., by completing and submitting an enrollment application). If the recipient exists in the directory but does not have an pre-existing account at 508, an IME account can be created for that recipient at 510. A package containing the restricted information may then be created at 512, and the recipient can be notified of the new package at 514 (e.g., via an email message that includes an Uniform Resource Locator (URL) address link to the package).

Figure 6:
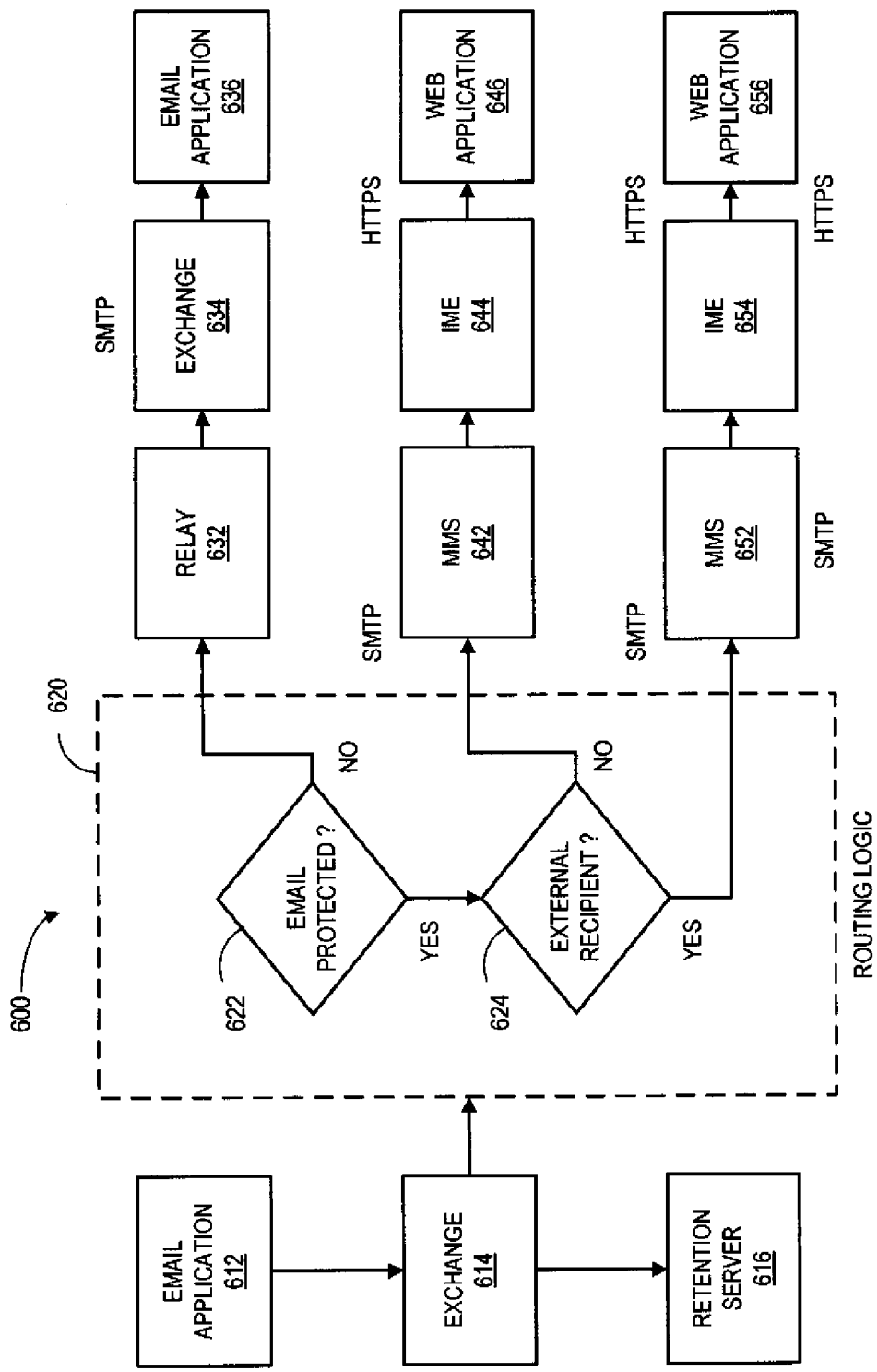
FIG. 6 is a block diagram overview of a system according to some embodiments of the present invention.
Figure 7:
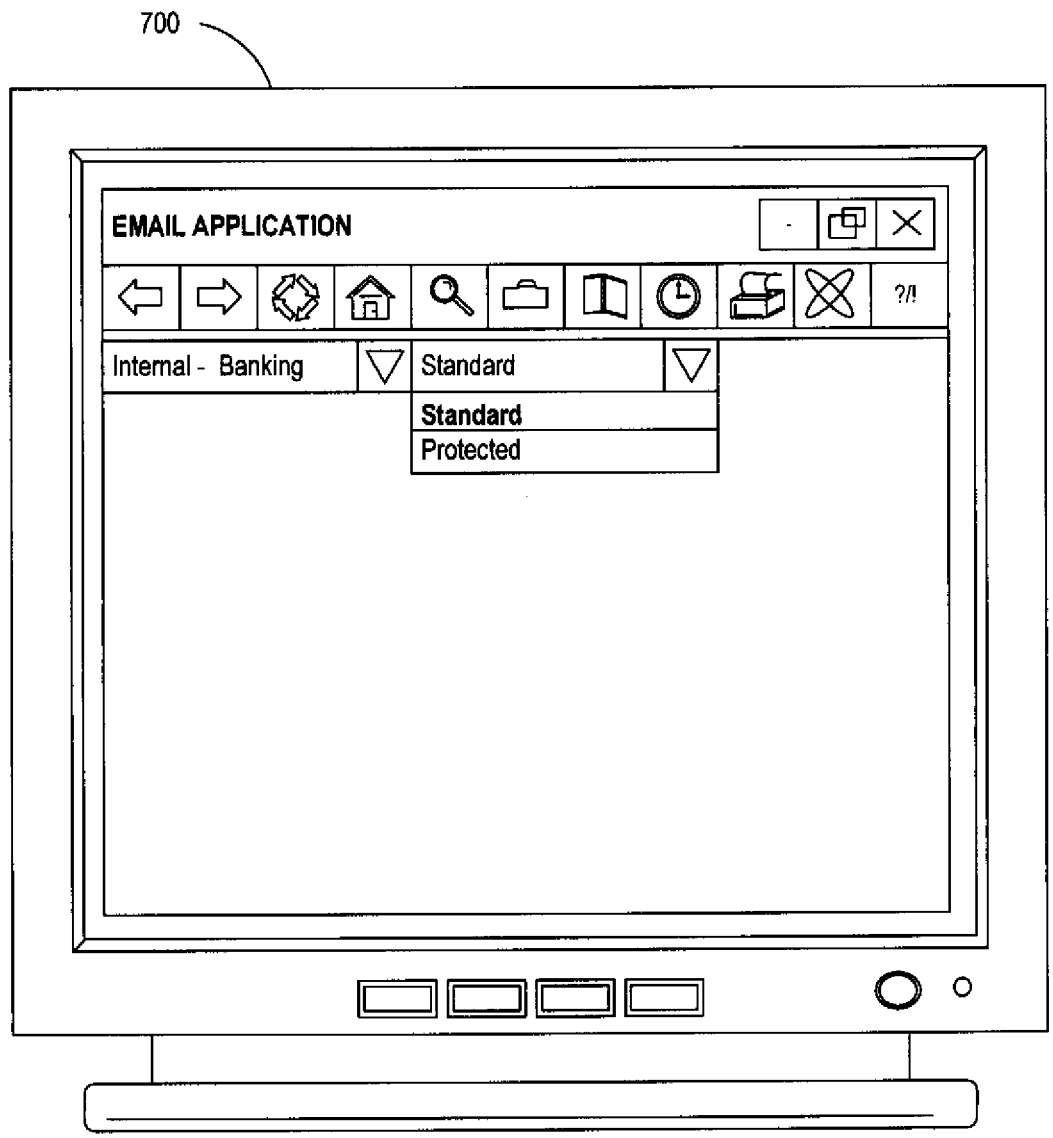
FIG. 7 illustrates a display according to another embodiments of the present invention.

FIG. 6 is a block diagram overview of a system 600 according to some embodiments of the present invention. As before, a plug-in at an email application 612 may let a user select a security classification for an email message. For example, FIG. 7 illustrates a display 700 according to another embodiments of the present invention. Note that in this case, a plurality of security classification categories are associated with the email message. In particular, a first drop-down box might, for example, let a user select a scope of the intended audience. A client device could then validate a recipient list of the email message by comparing it with the intended audience. A second box might, for example, let a user specify whether the message is to be delivered using "standard" or "protected" means.

Referring again to FIG. 4, the email application 410 may transmit the email message along with an indication of the security classification (e.g., "standard" or "protected") via a MICROSOFT EXCHANGE® server 614. For example, when a user "sends" the email message, a classification label may be saved as a MAPI property on the message. The EXCHANGE® server 614 might then convert the MAPI property to a SMTP header. For example, the following header might be provided:

X-Mailer: Internet Mail Service (5.5.2533.33)
X-GS-Classification: General Business~External~Standard~
Content-Type: text/plain According to some embodiments, the security device inserts a classification string at the bottom of an outgoing message. If the classification is found on an incoming message (e.g., an external user has "replied" to an original email message), the security device 620 may insert the string back into the SMTP header. According to some embodiments, a copy of the message is stored by a retention server 616.

The EXCHANGE® server 420 may then send the message to an email content security device 620, such as the MAIL MARSHAL® application. The security device 620 may use the security classification to determine message routing. In particular, if the email message is not "protected" at 622, a relay 632 may send SMTP information associated with a standard email message to an email application 636 via an exchange 634.

If the email is "protected" and the recipient is not external at 624 (e.g., the recipient might be another employee or otherwise be associated with a local environment), the security device 620 transmits SMTP information to a MMS 642. Because the security device 620 has already performed the routing logic, note that the MMS 642 might not need to perform such logic at this stage. The MMS 642 may then send COBRA information to an IME 644, which in turn can provide the information to the internal recipient by transmitting Hyper Text Transfer Protocol over SSL (HTTPS) to a Web application 646.

If the email is "protected" and the recipient is external at 624 (e.g., the recipient might work for another company), the security device 620 transmits SMTP information to a MMS 652. Note that in the case of external recipients, it may be desirable to hide internal addressing scheme information. If so, the MMS 652 may rewrite all internal addresses on outgoing messages in their external format (joe.smith@gs.com). The same process may done in reverse for incoming messages from the IME 654. The MMS 652 may forward incoming messages to the recipient's internal address. To facilitate address rewriting, a directory feed may be used to load user records into an MMS database. Moreover, the MMS 652 may use an SQL server to store the user directory, configuration, rules and logs.

The MMS 652 may then send COBRA information to an IME 654, which in turn can provide the information to the external recipient by HTTPS to a Web application 646. For example, the recipient may need to log onto the IME 654 and receive a package containing the protected information. Note that packages may be stored on a file system in encrypted format.

Senders might not have direct interaction with the IME 654. For example, an employee might send messages to external recipients using the OUTLOOK email application 612. Messages classified as "Protected" are routed to the MMS 652 and delivered to the external recipient via the IME 654. Replies sent from the IME 654 are forwarded by the MMS 652 back to the security device 620 and then to the user's Exchange server, where the message is viewed in Outlook.

External recipients interact with the IME 654 via a Web-based interface. The recipient is provided with an inbox and the ability to send and receive messages to other users on the system. The IME 654 may be configured to allow only recipients with accounts to send and receive packages. Note that sender might not be allowed to send messages to email addresses that are not registered on the system.

According to some embodiments, when a user clicks Send, a plug-in may validate the recipient list of an email message against a specified security classification according to a rule set. If any recipients do not fall into the selected distribution, the user may be prompted to make a change before the message is sent.

In some cases, a plug-in may determine if a recipient is within a group specified by the security information by validating an email sub-domain of the recipient's SMTP address. By way of example, if a sender indicates that the message should only be sent to "Internal-Accountants," all addresses matching *.accounting.company.com might be considered as appropriate recipients.

In some cases, however, the validation could be more complicated. For example, a security classification might indicate that the message should only be sent to members of a particular project team, the members of that team might frequently change. According to some embodiments, such selections may validated by checking XML files called "white lists" that are generated (as changes happen). Such white lists could, for example, be stored in a project's root folder.

Figure 8:
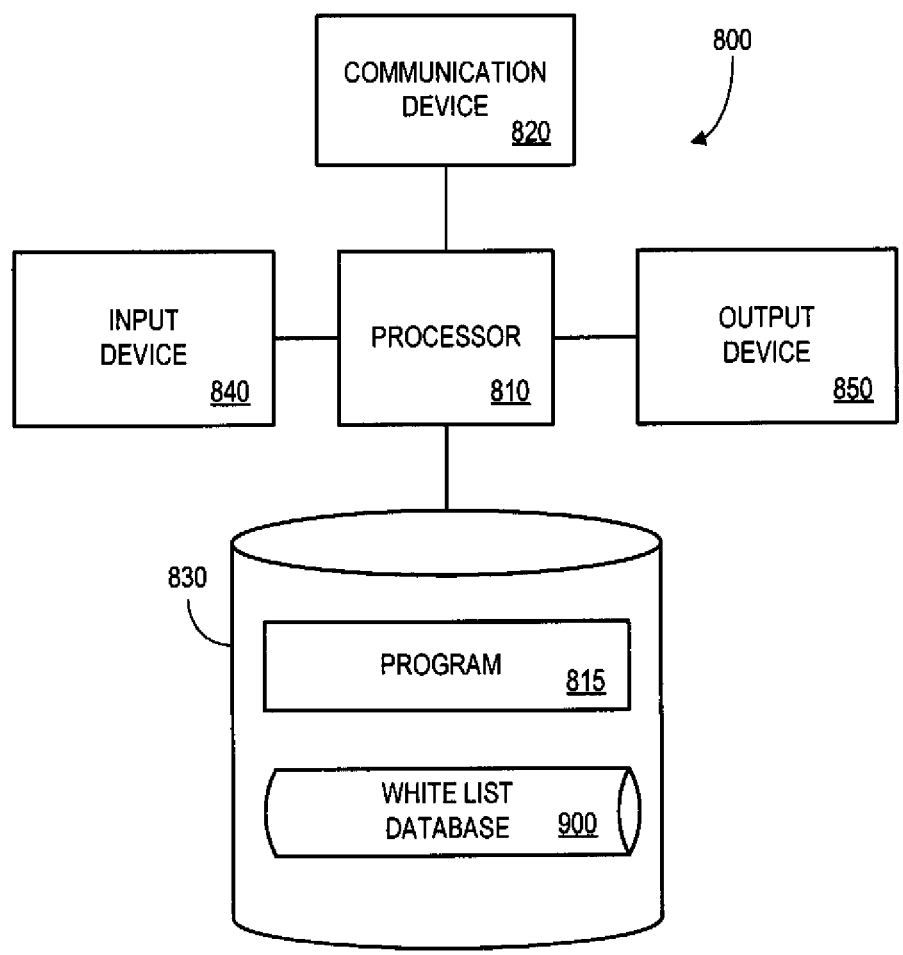
FIG. 8 is a client device according to some embodiments of the present invention.

FIG. 8 is a client device 800 according to some embodiments of the present invention. The client device 800 may be associated with, for example, sending device 110 described with respect to FIG. 1. The client device 800 includes a processor 810, such as one or more INTELL® Pentium® processors, coupled to a communication device 820 configured to communicate via, for example, a communication channel or network. The communication device 820 may be used to communicate, for example, with one or more servers. The processor 810 may also receive information via an input device 840 (e.g., a keyboard or computer mouse used to define security information) and provide information via an output device 850 (e.g., a display or printer that provides security information).

The processor 810 is also in communication with a storage device 830. The storage device 830 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

As shown in FIG. 8, the storage device 830 also stores a program 815 that may store instructions to control the operation of the processor in accordance with any of the embodiments described herein. According to some embodiments, the storage device 830 further stores a white list database 900 such as the one illustrated in FIG. 9. The illustration and accompanying description of the database presented herein is exemplary, and any number of other database arrangements could be employed besides those suggested by the figures.

FIG. 9 is a tabular representation of the white list database 900 according to one embodiment of the present invention. The table includes entries identifying recipients that may access restricted information. The table also defines fields 902, 904, 906, 908 for each of the entries. The fields specify: a recipient identifier 902, a recipient name 904, a recipient email address 906, and security information 908 (e.g., which groups the recipient is a member of).

Referring again to FIG. 8, the client device 800 might be designed such that if the white list database 900 is not found when it should be present, an error is logged but the user is allowed to send an email message anyway.

The information in the white list database 900 may be created and updated, for example, when:
 project team members are added or removed, or
 a user moves locations (e.g., and is associated with a new email address).

According to some embodiments, white list databases 900 throughout an enterprise may be updated via a nightly batch job that processes the changes Thus, embodiments of the present invention may provide flexible access to restricted information while reducing the likelihood that such information will be inadvertently provided to parties who should not be able to access the information.

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although some embodiments have been described herein with respect to financial information, the present invention may be used in connection with any other type of restricted information. For example, a governmental regulation might require that access to certain documents be limited (e.g., documents might be considered "classified" or "secret"). Similarly, a judicial decree or court order might limit who should be allowed to access information (e.g., only the parties to a civil action and a limited number of attorneys might be allowed to view trade secret information). As another example, access to information that concerns a person's expectation of privacy might be limited (e.g., a person's medical records). As still another example, a limited number of bank employees may be allowed to access information when suspicious activity has been detected with respect to a bank account (e.g., transferring large amounts of money out of a foreign country). Note that in some cases, an enterprise might be required to take "reasonable" steps to protect information or a statute might explicitly provide a "safe harbor" when certain protections are in place. In either case, some or all of the various embodiments described herein might be used to demonstrate that such obligations have been met.

Moreover, the systems provided herein are merely for illustration and embodiments may be associated with any type of network topologies.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A processor-implemented method of facilitating a secure distribution of information, comprising:
 determining at a client device that an email message is being generated by a user;
 associating a security classification with the email message;

identifying each intended recipient of the email message;
verifying each intended recipient has a security classification that corresponds to the security classification associated with the email message by comparing each intended recipient with a list of presently allowed potential recipients derived at least in part on the security classification associated with the email message;
generating a recipient confirmation prompt if a security classification associated with an intended recipient does not correspond to the security classification associated with the email message;
finalizing the email message for transmission according to the email message's intended recipient verification and the security classification;
transmitting the email message along with an indication of the security classification and routing the email message based, at least in part, on the security classification and the email message's intended recipient verification;
determining whether a destination associated with the email message is (i) within a local environment or (ii) external to the local environment;
if it is determined that the destination is external, arranging for information to be provided via a Web site in accordance with the security classification;
determining whether a recipient is able to access information via the Web site; and
if it is determined that the recipient is not able to access information via the Web site, notifying the user via the client device.

2. The method of claim 1, wherein said associating is performed using a plugin application executing at the client device.

3. The method of claim 1, wherein the list is a white list stored locally at the client device.

4. The method of claim 3, wherein the white list is periodically updated by a remote device.

5. The method of claim 1, further comprising:
automatically associating the security classification with the email message.

6. The method of claim 5, wherein the associating is based at least in part on at least one of: (i) information included in the email message, (ii) an attachment associated with the email message, (iii) information associated with a user, or (iv) information associated with a destination of the email message.

7. The method of claim 1, further comprising:
receiving an indication of the security classification from the user.

8. The method of claim 7, wherein said receiving includes:
providing a default security classification; and
receiving from the user an adjustment to the default security classification.

9. The method of claim 8, further comprising:
logging information associated with the adjustment.

10. The method of claim 1, further comprising:
enforcing a rule associated with the security classification.

11. The method of claim 10, wherein said enforcing is performed at the client device.

12. The method of claim 10, wherein said enforcing is performed at a server remote from the client device.

13. The method of claim 12, wherein the server is associated with at least one of: (i) a secure mail service, (ii) a message managing system, or (iii) an integrated messaging exchange.

14. The method of claim 1, further comprising:
automatically modifying the email message in accordance with the security classification.

15. The method of claim 1, further comprising:
preventing the email message from reaching a destination in accordance with the security classification.

16. The method of claim 1, wherein the client device comprises at least one of:
(i) a personal computer, (ii) a personal digital assistant, (iii) a mobile computer, or (iv) a wireless device.

17. The method of claim 1, wherein a plurality of security classification categories are associated with the email message.

18. The method of claim 1, further comprising:
intercepting the email message if the recipient confirmation prompt is overridden.

19. An apparatus to facilitate a secure distribution of information, comprising:
a client device to determine that an email message is being generated by a user;
an input device configured to:
receive information associated with a security classification for the email message;
identify each intended recipient of the email message;
verify each intended recipient has a security classification that corresponds to the security classification associated with the email message by comparing each intended recipient with a list of presently allowed potential recipients derived at least in part on the security classification associated with the email message;
generating a recipient confirmation prompt if a security classification associated with an intended recipient does not correspond to the security classification associated with the email message;
finalize the email message for transmission according to the email message's intended recipient verification and the security classification;
determine whether a destination associated with the email message is (i) within a local environment or (ii) external to the local environment;
if it is determined that the destination is external, arrange for information to be provided via a Web site in accordance with the security classification;
determine whether a recipient is able to access information via the Web site; and
if it is determined that the recipient is not able to access information via the Web site, notify the user via the client device; and
a transmitting device to transmit the email message along with an indication of the security classification and routing the email message based, at least in part, on the security classification and the email message's intended recipient verification.

20. A processor-implemented method of facilitating a secure distribution of information, comprising:
receiving from a remote server information associated with an allowed recipient white list;
storing the information locally at a client device;
determining at the client device that an email message is being generated by a user;
associating a security classification with the email message, wherein said associating is performed using a plug-in application executing at the client device;
identifying each intended recipient of the email message;
verifying each identified recipient by comparing each security classification associated with each intended recipient of the email message with a corresponding security classification of the locally stored presently allowed recipient white list based at least in part on the security classification;

if a security classification associated with an intended recipient does not correspond with the security classification on the presently allowed recipient white list, generating a recipient confirmation prompt querying whether the intended recipient should receive the email message;

finalizing the email message for transmission according to the email message's intended recipient verification and the security classification; and determining whether a destination associated with the email message and the intended recipient is (i) within a local environment or (ii) external to the local environment; and if the destination is external, arranging for information to be provided via a Web site in accordance with the security classification.

* * * * *